United States Patent
Berggren

(10) Patent No.: US 11,178,722 B2
(45) Date of Patent: Nov. 16, 2021

(54) DISCONTINUOUS RECEPTION

(71) Applicant: Sony Mobile Communications Inc., Tokyo (JP)

(72) Inventor: Anders Berggren, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 16/347,279

(22) PCT Filed: Nov. 4, 2016

(86) PCT No.: PCT/EP2016/076652
§ 371 (c)(1),
(2) Date: May 3, 2019

(87) PCT Pub. No.: WO2018/082780
PCT Pub. Date: May 11, 2018

(65) Prior Publication Data
US 2019/0281653 A1    Sep. 12, 2019

(51) Int. Cl.
*H04W 76/28* (2018.01)
*H04W 76/27* (2018.01)
*H04W 52/02* (2009.01)
*H04W 68/00* (2009.01)

(52) U.S. Cl.
CPC ....... *H04W 76/28* (2018.02); *H04W 52/0229* (2013.01); *H04W 52/0251* (2013.01); *H04W 68/00* (2013.01); *H04W 76/27* (2018.02)

(58) Field of Classification Search
CPC . H04W 52/0251; H04W 68/00; H04W 76/27; H04W 76/28
See application file for complete search history.

(56) References Cited

U.S. PATENT DOCUMENTS

| | | | |
|---|---|---|---|
| 9,179,407 B2* | 11/2015 | Donthi | H04W 76/28 |
| 2013/0301499 A1 | 11/2013 | Jain | |
| 2015/0109979 A1* | 4/2015 | Miklos | H04W 76/28 370/311 |
| 2016/0044578 A1* | 2/2016 | Vajapeyam | H04W 52/0216 370/252 |
| 2016/0057806 A1* | 2/2016 | Wittberg | H04W 76/28 370/336 |
| 2018/0098285 A1* | 4/2018 | Yu | H04W 4/70 |

OTHER PUBLICATIONS

International Search Report and Written Opinion from corresponding International Patent Application No. PCT/EP2016/076652 dated Nov. 13, 2017; 18 pages.

* cited by examiner

*Primary Examiner* — Rhonda L Murphy
(74) *Attorney, Agent, or Firm* — Tucker Ellis LLP

(57) ABSTRACT

A terminal (130) includes an interface configured to wirelessly communicate with a network (100) having a plurality of base stations (112, 112-1, 112-2), and at least one processor configured to control the interface to operate according to a first discontinuous reception cycle (421), to detect terminal-initiated mobility (473) from a source base station (112, 112-1, 112-2) of the plurality of base stations (112, 112-1, 112-2) to a target base station (112, 112-1, 112-2) of the plurality of base stations (112, 112-1, 112-2), and to control the interface to operate according to a second discontinuous reception cycle (422) in response to the terminal-initiated mobility (473).

19 Claims, 13 Drawing Sheets

DISCONTINUOUS RECEPTION

TECHNICAL FIELD

Various embodiments of the invention generally relate to discontinuous reception. Various embodiments of the invention specifically relate to transitioning between different discontinuous reception cycles in response to terminal-initiated mobility.

BACKGROUND

In order to reduce power consumption of terminals that are connectable to a network, so-called Discontinuous Reception (DRX) is known. For example, according to the Third Generation Partnership Project (3GPP) Long Term Evolution (LTE) protocols, DRX can be implemented as described in 3GPP Technical Specification (TS) 36.321 (Release 13.0.0), section 5.7 for Radio Resource Control (RRC) connected mode and in 3GPP TS 36.304, section 7.1 for RRC idle mode.

According to 3GPP LTE DRX for connected mode (connected DRX), the terminal (UE) is ready to receive downlink (DL) payload data during an ON time of a DRX cycle. According to 3GPP LTE DRX for idle mode (idle DRX), the UE is ready to receive MME-initiated DL paging signals during the ON time of the DRX cycle. In idle DRX, a RRC connection is not established during the ON time, but only established on demand if the UE is in fact paged by the network.

Both, in RRC connected and RRC idle, the UE may be registered with the network, a state which is referred to as the Evolved Packet System (EPS) Mobility Management (EMM) registered. On the other hand, an EPS Connection Management (ECM) connection is not maintained during RRC idle (ECM idle), while it is maintained during RRC connected (ECM connected).

However, such DRX techniques according to reference implementations face certain restrictions and drawbacks. For example, it has been observed that the state management—i.e., switching between RRC connected, RRC idle, ECM connected, and ECM idle—often requires significant bandwidth on the spectrum for control signaling. Furthermore, attempts to reduce the signaling load often risk synchronization between the radio access network (RAN) operation defined by the RRC state and the core network (CN) operation defined by the ECM state.

SUMMARY

Therefore, a need for advanced techniques for DRX exists. In particular, a need exists for such techniques which overcome or mitigate at least some of the above-identified drawbacks and restrictions.

A UE includes an interface. The interface is configured to wirelessly communicate with a network having a plurality of base stations. The terminal also includes at least one processor. The at least one processor is configured to control the interface to operate according to a first DRX cycle. The at least one processor is further configured to detect terminal-initiated mobility from a source base station of a plurality of base stations to a target base station of the plurality of base stations. The terminal is further configured to control the interface to operate according to a second DRX cycle in response to the terminal-initiated mobility.

A method includes controlling an interface of a terminal to operate according to a first DRX cycle for communication with the network having a plurality of base stations. The method further includes detecting terminal-initiated mobility from a source base station of the plurality of base stations to a target base station of the plurality of base stations. The method further includes controlling the interface to operate according to a second DRX cycle in response to the terminal-initiated mobility.

A computer program product includes program code which can be executed by at least one processor. Executing the program code causes the at least one processor to perform a method. The method includes controlling an interface of a terminal to operate according to a first DRX cycle for communication with the network having a plurality of base stations. The method further includes detecting terminal-initiated mobility from a source base station of the plurality of base stations to a target base station of the plurality of base stations. The method further includes controlling the interface to operate according to a second DRX cycle in response to the terminal-initiated mobility.

A computer program includes program code which can be executed by at least one processor. Executing the program code causes the at least one processor to perform a method. The method includes controlling an interface of a terminal to operate according to a first DRX cycle for communication with the network having a plurality of base stations. The method further includes detecting terminal-initiated mobility from a source base station of the plurality of base stations to a target base station of the plurality of base stations. The method further includes controlling the interface to operate according to a second DRX cycle in response to the terminal-initiated mobility.

A base station includes at least one processor. The at least one processor is configured to attempt transmission of DL data to a terminal according to a first DRX cycle of the terminal. The at least one processor is further configured to trigger transmission of a DL paging signal to the terminal according to a second DRX cycle of the terminal, if the transmission of the DL data fails.

A method includes attempting transmission of DL data to a terminal according to a first DRX cycle of the terminal. The method further includes triggering transmission of a DL paging signal to the terminal according to a second DRX cycle of the terminal.

A computer program product includes program code which can be executed by at least one processor. Executing the program code causes the at least one processor to perform a method. The method includes attempting transmission of DL data to a terminal according to a first DRX cycle of the terminal. The method further includes triggering transmission of a DL paging signal to the terminal according to a second DRX cycle of the terminal.

A computer program includes program code which can be executed by at least one processor. Executing the program code causes the at least one processor to perform a method. The method includes attempting transmission of DL data to a terminal according to a first DRX cycle of the terminal. The method further includes triggering transmission of a DL paging signal to the terminal according to a second DRX cycle of the terminal.

A terminal includes at least one processor configured to operate according to a connected mode and to selectively transition into an enhanced connected mode if a prerequisite condition is met. A data connection set up during the connected mode is maintained at least initially during the enhanced connected mode. UE-initiated mobility is prohibited during the connected mode. UE-initiated mobility is allowed during the enhanced connected mode.

The prerequisite condition may optionally include at least one of expiry of a timer and reception of a network-originating control message indicative of instructions to trigger the second discontinuous reception cycle.

For example, the data connection may be maintained at least until the UE-initiated mobility occurs.

For example, the data connection may not be released once the UE-initiated mobility occurs.

For example, the UE-initiated mobility may only be allowed for a predefined RAN-based paging group.

For example, the UE may not inform the network about the UE-initiated mobility.

For example, the connected mode may be associated with a first DRX cycle and the enhanced connected mode may be associated with a second DRX cycle, e.g., after occurrence of the UE-initiated mobility.

For example, the enhanced connected mode may be associated with an intermediate DRX cycle prior to the UE-initiated mobility.

A method includes a terminal operating according to a connected mode. The method further includes selectively transitioning into an enhanced connected mode if a prerequisite condition is met. A data connection set up during the connected mode is maintained at least initially during the enhanced connected mode. UE-initiated mobility is prohibited during the connected mode. UE-initiated mobility is allowed during the enhanced connected mode.

A computer program product includes program code which can be executed by at least one processor. Executing the program code causes the at least one processor to perform a method. The method includes a terminal operating according to a connected mode. The method further includes selectively transitioning into an enhanced connected mode if a prerequisite condition is met. A data connection set up during the connected mode is maintained during the enhanced connected mode. UE-initiated mobility is prohibited at least initially during the connected mode. UE-initiated mobility is allowed during the enhanced connected mode.

A computer program includes program code which can be executed by at least one processor. Executing the program code causes the at least one processor to perform a method. The method includes a terminal operating according to a connected mode.

The method further includes selectively transitioning into an enhanced connected mode if a prerequisite condition is met. A data connection set up during the connected mode is maintained at least initially during the enhanced connected mode. UE-initiated mobility is prohibited during the connected mode. UE-initiated mobility is allowed during the enhanced connected mode.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
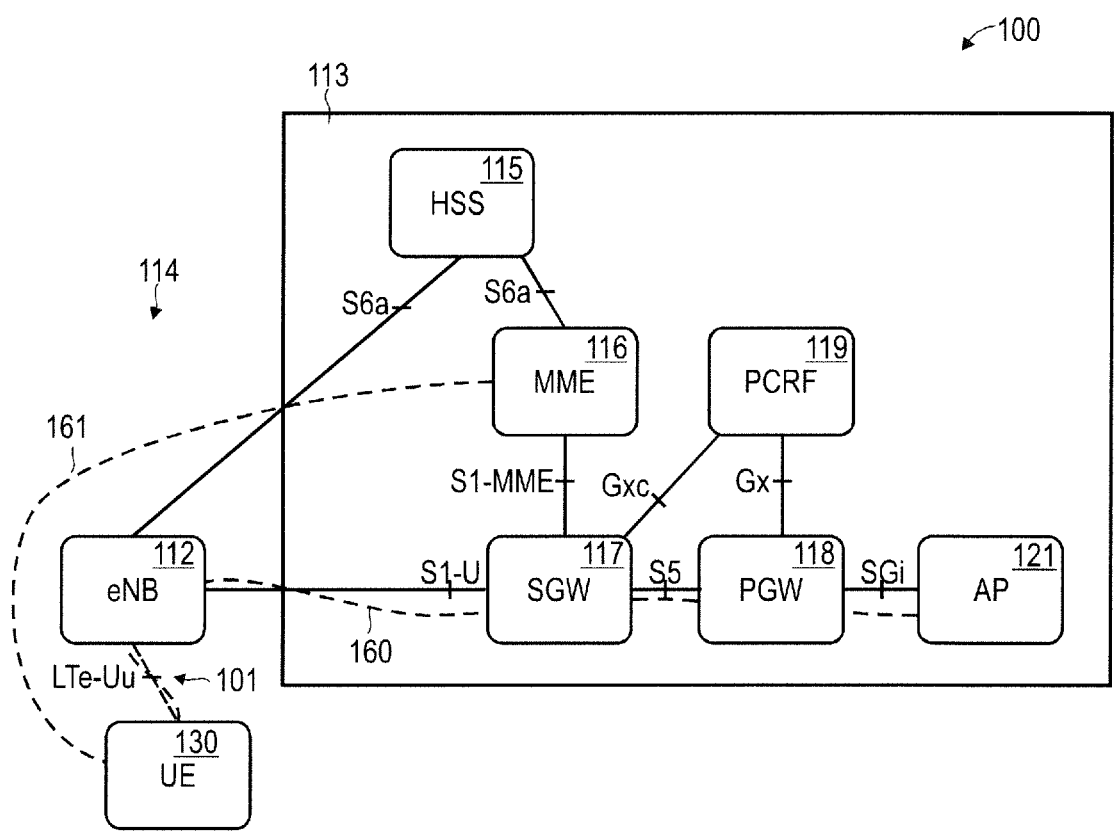
FIG. 1 schematically illustrates a network including a CN and a RAN according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of repeatedly switching between an active state and a sleep state of an interface of a UE are described. Sometimes, such techniques of repeatedly switching between at least one active and a sleep state are referred to as DRX. Examples of active states include states in which the UE listens for DL paging signals and states in which the UE listens for DL data, e.g., DL control data and/or DL payload data. Thus, active states may also be referred to as ready-to-receive states. By only activating the active state of the interface every once in a while using a timing of the DRX cycle, power consumption of the UE can be reduced.

For example, the DRX cycle—e.g., for each repetition—may include a certain ON time during which one or more active states of the interface are activated. Further, each repetition may include an OFF time during which a sleep state of the interface is activated.

A DRX cycle may be implemented according to a timing. For example, the timing may be negotiated between the UE and the network. Such negotiation of the timing may involve UL control signaling and/or DL control signaling. Sometimes, the negotiation may take place as part of an attach procedure for establishing a data connection on a wireless link between the UE and the network. In other examples, it would also be possible that the timing is predefined, e.g., according to a fixed standard, etc. The timing may be repetitive, i.e., may define repetitions of switching between the different states. For example, the timing may be repetitive in time domain: In some examples, it is possible that the timing implements a periodicity for subsequent repetitions. It is also possible that the repetitive timing is not strictly periodic, but shows a certain variation from repetition to repetition.

The interface may be fully or largely powered down when operating in the sleep state. Sometimes, the sleep state is also referred to as dormant state or power save state. For example, an analog front end of the interface may be disabled during the sleep state. This may include powering down one or more of the following: an analog amplifier; an analog-to-digital converter. For example, a supply voltage may not be provided to the analog amplifier and/or the analog-to-digital converter during the sleep state. Generally, during the sleep state the interface may be unfit for receiving DL data on the wireless link. The UE may not send position updates in the sleep state. Thus, generally, in the sleep state it may not be possible to send any DL data to the UE. It is possible that during the sleep state the UE remains registered in a respective repository of the network. All this enables a low power consumption of the UE in the sleep state.

Various active states are conceivable. Examples include listening for DL data and/or listening for DL paging signals. In the active state, the interface of the UE may be powered up fully or to at least some degree. For example, the analog front end of the interface of the UE may not be fully powered down, but generally functional. However, certain functions in the digital front end may be disabled which may include limited demodulation/decoding functionality, etc.

Switching between an active state and a sleep state according to a DRX cycle may implemented in one or more modes of operating the UE. Examples include a connected mode and an idle mode. In the connected mode, and ongoing data connection between the UE and the network may be maintained. For example, the data connection may be implemented on the Network layer of the Open Systems Interconnection (OSI) model according to the International Standardization Organization (ISO) ITU-T X.200 (July 1994) document. For example, the data connection may include a bearer for identifying data on an UL payload channel and/or a DL payload channel. The UE may transmit frequent position updates to the network in the connected mode. For example, the serving cell at which the UE presently camps may be known at any given moment in time to the network. In the connected mode, the interface of the UE may be fully powered up. In the 3GPP LTE framework, an example is the RRC connected mode. Typically, the connected mode is associated with significant power consumption of the UE.

In the idle mode, it may not be required to maintain an ongoing data connection between the UE and the network. For example, in the idle mode—different to the connected mode —, the particular serving cell of a cellular network to which the UE is connectable may not be known to the network. The UE may or may not transmit infrequent position updates, e.g., when changing the tracking area, etc. For example, in the idle mode it may be possible for the network to page the UE, i.e., to send a DL paging signal to the UE, during a respective ON time of the idle mode DRX cycle when the interface of the UE is in the active state. However, it may not be possible to directly send DL data. The DL paging signal may trigger the UE to transition into the connected mode. This may involve performing an attach procedure for establishing the payload channels of the wireless link. An example of the idle mode in the 3GPP LTE framework is the RRC idle mode. See 3GPP TS 36.304 (2013), Release 11, Section 7 and 3GPP TS 36.331 (2013), Sections 5.3.2, 6.2.2.

Hereinafter, techniques are described which enable to implement different DRX cycles based on one or more trigger criteria. Such trigger criteria may, in particular, include UE-initiated mobility. UE-initiated mobility can relate to the UE switching from listening for transmissions from a source base station (BS) to a target BS without the CN, e.g., a MME, being informed accordingly. Thus, UE-initiated mobility can be different from a conventional handover (HO) where the change of the serving BS is coordinated by the network. UE-initiated mobility can relate to cell reselection autonomously triggered by the UE, e.g., without involvement of a MME.

Hereinafter, various techniques are described to trigger switching between different DRX cycles in connected mode of the UE. In particular, it could be possible to associate different DRX cycles with one and the same connected mode of the UE. In other examples, it would be possible to associate the different DRX cycles with different sub-modes of the connected mode. In any case, because different DRX cycles can be associated with the UE operating in connected mode, control signaling with respect to mode transitions can be reduced.

According to various examples, the techniques hide UE mobility to some larger or smaller degree from the CN. In particular, it is possible to use RAN-triggered paging for detecting the current serving BS if UE-initiated mobility has occurred.

These techniques enable reduction of the control signaling overhead. For example, by avoiding the need to perform a HO, HO signaling can be avoided. On the other hand, it is still possible to maintain a low latency for transmission to the UE, because the chosen DRX cycle can be dependent on whether UE-initiated mobility occurred or not. In other words, it may be possible to choose optimized DRX cycles depending on whether the serving BS known to the network is up-to-date or whether the serving BS has changed due to the UE-initiated mobility without knowledge of the network. Still further, it is possible to avoid misalignments between CN-based UE states and RAN-based UE states.

FIG. 1 illustrates aspects with respect to the network 100. FIG. 1 illustrates aspects with respect to the architecture of the network 100. The network 100 according to the example of FIG. 1 implements the 3GPP LTE architecture. According to 3GPP LTE, a wireless link 101 is defined in a RAN 114. The wireless link 101 is defined between a BS in the form of an evolved node B (eNB) 112 and one or more UEs 130. The wireless link 101 may implement one or more channels such as payload channels and/or control channels and/or paging channels, etc.

Furthermore, the network 100 includes a CN 113. The CN 113—the evolved packet core (EPC) in 3GPP LTE—is in communication with the RAN 114. The CN 113 includes a control layer and a data layer. The control layer includes control nodes such as the home subscriber server (HSS) 115, the mobile management entity (MME) 116, and the policy and charging rules function (PCRF) 119. The data layer includes gateway nodes such as the serving gateway (SGW) 117 and the packet data network gateway (PGW) 118.

For example, the MME 116 controls CN-initiated paging of the UEs 130 if the UE 130 operates in RRC idle mode. For example, the MME 116 is part of the activation of a data connection 160. The data connection 160 is activated if the UEs operates in RRC connected mode. To keep track of the current state of the UEs 130, the MME 116 sets the UE 130 to ECM connected or ECM idle. During ECM connected, a non-stratum access (NAS) connection 161 is maintained between the UE 130 and the MME 116. The NAS connection 161 implements an example of a mobility control connection.

The general functioning and purpose of the network nodes 115-119, 121 of the CN 113 is well known in the art such that a detailed description is not required in this context.

The data connection 160 is established between the UE 130 via the RAN 114 and the data layer of the CN 113 and towards an access point 121. For example, a connection with the Internet or another packet data network can be established via the access point 121. To establish the data connection 160, it is possible that the UE 130 performs a random access (RACH) procedure, e.g., in response to reception of DL paging signals. A server of the packet data network or the Internet may host a service for which payload data is communicated via the data connection 160. The data connection 160 may include one or more bearers such as a dedicated bearer or a default bearer. The data connection 160 may be defined on the RRC layer. Establishing of the data connection 160 may thus include OSI Network layer control signaling. By means of the data connection 160, resources may be allocated on payload channels such as the Physical Uplink Shared Channel (PUSCH) and/or the Physical DL Shared Channel (PDSCH) to facilitate transmission of payload data. A control channel such as the Physical DL Control Channel (PDCCH) can facilitate transmission of control data. Also a Physical Uplink Control Channel (PUCCH) can be implemented.

The illustration of the network 100 in the 3GPP LTE framework is for exemplary purposes only. Similar techniques can be readily applied to various kinds of 3GPP-specified architectures, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA). For example, the techniques described herein may be applied to the 3GPP eNB-IoT or MTC systems or 3GPP New Radio (NR) systems. See, for example, 3GPP RP-161321 and RP-161324. Furthermore, respective techniques may be readily applied to various kinds of non-3GPP-specified networks, such as Bluetooth, satellite networks, IEEE 802.11x Wi-Fi technology, etc.

Figure 2:
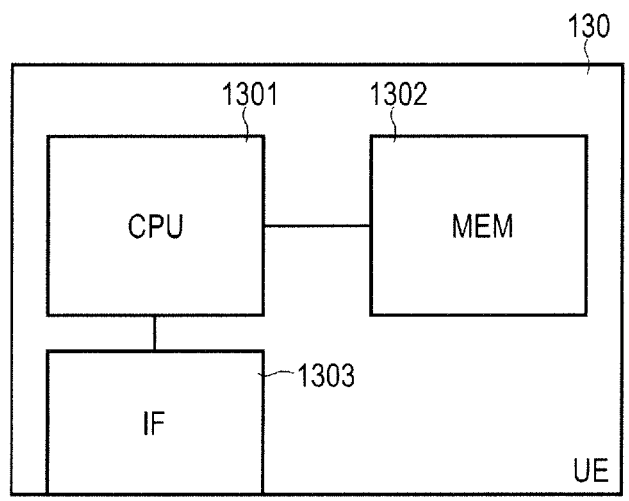
FIG. 2 schematically illustrates a UE according to various examples.

FIG. 2 illustrates aspects with respect to the UE 130. The UE 130 includes a processor 1301, e.g., a multi-core processor. The UE 130 further includes a memory 1302, e.g., a non-volatile memory. The UE 130 further includes an interface 1303.

The interface 1303 may include a digital front end and/or an analog front end. The analog front end may be connectable to one or more antennas. For example, the interface 1303 may include one or more antenna ports. For example, the analog front end may include an amplifier such as a low noise amplifier and an analog-to-digital converter for receiving modulated and encoded signals. The analog front end may include a digital-to-analog converter for transmission.

For example, the digital front end—when receiving data—may be configured to perform tasks such as: demodulation; decoding; de-interleaving; calculation of checksums; etc. For example, the digital front end may implement lower level functionality according to the OSI model. Typically, such tasks as demodulation and decoding are also associated with considerable energy consumption.

The interface 1303 may operate according to different states of operation. These states may include one or more active states in which the interface 1303 is able to receive some or all DL data and/or signals transmitted on the wireless link 101. For example, in the active states, the amplifier and/or the analog-to-digital converter may be at least sometimes and/or at least partly provided with a supply voltage. These states may further include a sleep state in which the interface 1303 is unfit to receive DL data transmitted on the wireless link 101. Typically, the power consumption of the UE 130 is reduced if the interface 1303 operates according to the sleep state if compared to the interface 1303 operating according to one of the at least one active states. The different states may be alternatingly activated based on a DRX cycle. Different states may be associated with different modes in which the UE 130 operates towards the network 100, e.g., idle mode, connected mode or power saving mode.

The memory 1302 may store control instructions that may be executed by the processor 1301. Executing the control instructions can cause the processor 1301 to perform techniques of power saving; these may include controlling the interface 1303 to operate according to different DRX cycles.

Figure 3:
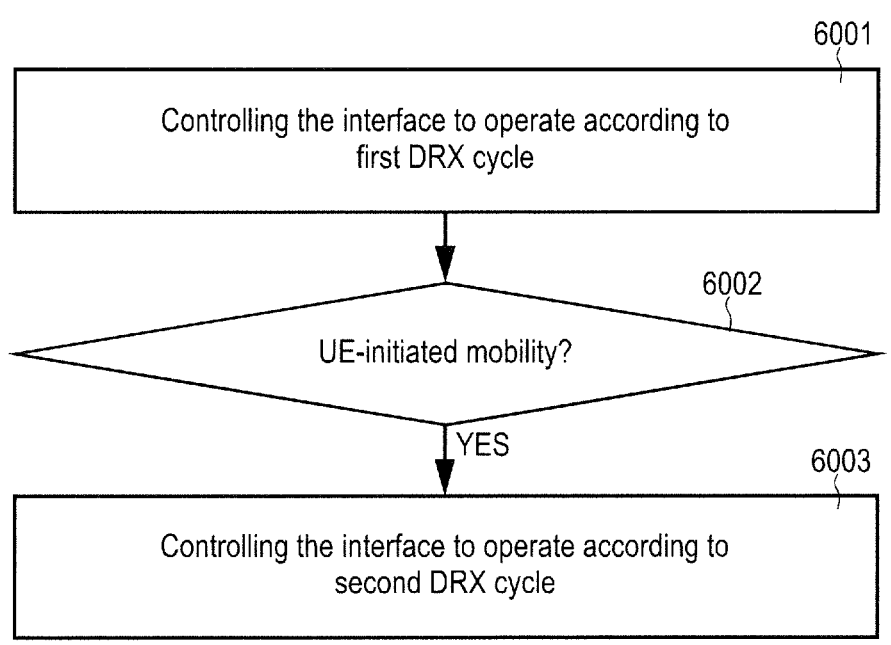
FIG. 3 is a flowchart of a method according to various examples.

FIG. 3 is a flowchart of a method according to various examples. For example, the method according to FIG. 3 may be executed by the processor 1301 of the UE 130.

First, in block 6001, the interface of the UEs control to operate according to a first DRX cycle. The first DRX cycle includes an active state and a sleep state. In particular, the first DRX cycle may include a connected state during which the UEs 130 attempts to receive DL data—e.g., DL control data and/or DL payload data—from the network. For example, the UE could operate according to the 3GPP LTE RRC connected mode or a modified version thereof in block 6001.

Next, in block 6002, it is checked whether UE-initiated mobility occurs. UE-initiated mobility can relate to the UE switching from a source BS to a target BS. For example, the decision to switch from the source BS to the target BS may be taken by the UE without the knowledge of the network. For example, an MME of the CN may not be informed accordingly. A HO procedure may be avoided.

If it is detected, in block 6002, that UE-initiated mobility occurred—e.g., by the UE selecting a new cell —, in block 6003 the interface is configured to operate according to a second DRX cycle. The second DRX cycle may be at least partly different from the first DRX cycle; i.e., the second DRX cycle may include at least one parameter which is set differently from the respective parameter of the first DRX cycle. In one example, the second DRX cycle may generally correspond to the first DRX cycle, but may implement a different timing. For example, the duty cycle of the second DRX cycle may be different from the duty cycle of the first DRX cycle. Alternatively or additionally, the duration of the various states may be different from each other. In another example, it would be possible—additionally or alternatively—that the second DRX cycle includes at least one different state of operation of the interface of the UE if compared to the first DRX cycle. For example, the second DRX cycle may include a different active state and/or sleep state if compared to the first DRX cycle. In particular, in some examples, it would be possible that, both, the first DRX cycle, as well as the second DRX cycle include an active state and a sleep state; however, the active states of the first DRX cycle and the second DRX cycle may be different from each other.

Generally, the first DRX cycle as well as the second DRX cycle may be associated with a connected mode of UE operation, e.g., 3GPP LTE RRC Connected mode. For example, transition from the first DRX cycle to the second DRX cycle may not involve transmission of a control message which releases the data connection 160 such as the RRC connection.

As will be appreciated from the description of FIG. 3, such techniques enable to reduce control signaling. In particular, an option is given to perform UE-initiated mobility during the first DRX cycle—even though, in some examples, the first DRX cycle may be implemented in the connected mode where conventionally only network-initiated mobility is implemented. Thus, a need for HOs may be reduced. Additionally, in some examples, it may not be required that control signaling is used for reconfiguring the UE for switching from operation according to the first DRX cycle to operation according to the second DRX cycle; e.g., alternatively or additionally, a timer or another trigger criterion could be used.

Figure 4:
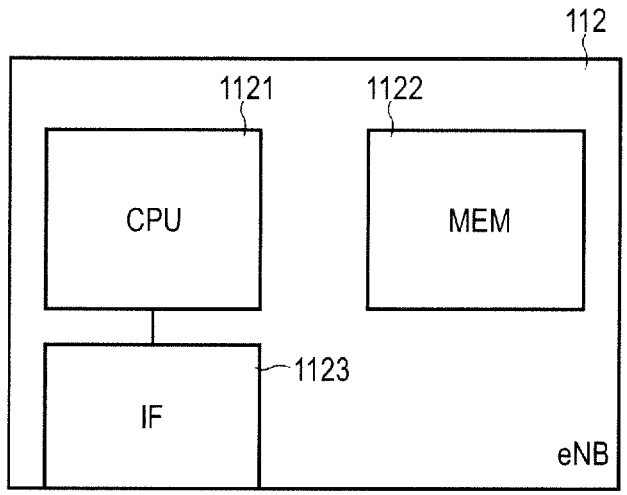
FIG. 4 schematically illustrates a base station according to various examples.

FIG. 4 illustrates aspects with respect to the eNB 112, albeit similar techniques could be readily implemented with respect to various kinds and types of BSs. The eNB 112 includes a processor 1121, e.g., a multi-core processor. The eNB 112 further includes a memory 1122, e.g., a non-volatile memory. The eNB 112 further includes an interface 1123. The interface 1123 may include a digital front end and/or an analog front end. The analog front end may be connectable to one or more antennas. For example, the interface 1123 may include one or more antenna ports. For example, the analog front end may include an amplifier such as a low noise amplifier and an analog-to-digital converter for receiving modulated and encoded signals on the wireless link 101.

The memory 1122 may store control instructions that may be executed by the processor 1121. Executing the control instructions can cause the processor 1121 to perform techniques of power saving at a UE 130 connectable to the eNB 112. Such techniques may include synchronizing communication with the UE 130 according to DRX cycle of the UE.

Figure 5:
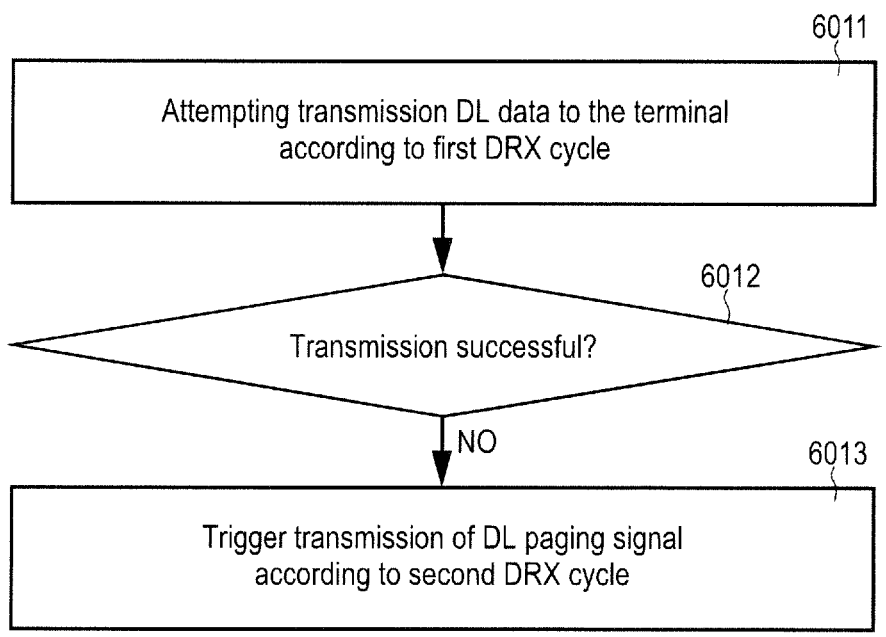
FIG. 5 is a flowchart of a method according to various examples.

FIG. 5 is a flowchart of a method according to various examples. For example, the method according to FIG. 5 may be executed by the processor 1121.

In block 6011, transmission of DL data is attempted. Here, the transmission is implemented according to a first DRX cycle. As such, the transmission may be synchronized with the ON time of the DRX cycle. For example, the DL data may relate to control data such as RRC control data, Acknowledgement Repeat Request (ARQ) acknowledgments, a DL scheduling assignment, and/or an uplink scheduling grant. Alternatively or additionally, the DL data may also relate to payload data (sometimes referred to as user data). Respective channels may be implemented on the data connection 160. For example, the eNB could list operation of the UE according to the 3GPP LTE RRC connected mode or a modified version thereof in block 6011.

Next, in block 6012, it is checked whether the transmission of the DL data in block 6011 has been successful. For example, in block 6012 it can be checked whether the UE sends a positive acknowledgment or negative acknowledgment. In block 6012, ARQ techniques may be employed. In particular, in block 6012 it can be checked whether the UE 130 is reachable at all when transmitting the DL data. The UE 130 may be judged to be reachable if a positive acknowledgement and/or a negative acknowledgement is received.

If it is detected that the transmission has not been successful, transmission of a DL paging signal to the UE according to the second DRX cycle is triggered. For example, in block 6013, it may be possible to directly transmit the DL paging signal according to the second DRX cycle. If the UE listens to the same BS, the DL paging signal can be received. Alternatively or additionally, it would also be possible to send a control message to one or more further BSs in order to trigger the transmission of the DL paging signal by the one or more further BSs. In some examples, the one or more further BSs may be part of a network-defined RAN paging group, e.g., a tracking area. As such, the paging may be RAN-triggered.

The method according to FIG. 5 takes into account that it is possible that the UE has performed UE-initiated mobility. In such a case, the attempted transmission in block 6011 is deemed to fail. Then, it may be required to initiate paging of the UE. Yet, a HO is avoided and still there is a chance that the initial transmission of DL data is already successful.

Figure 6:
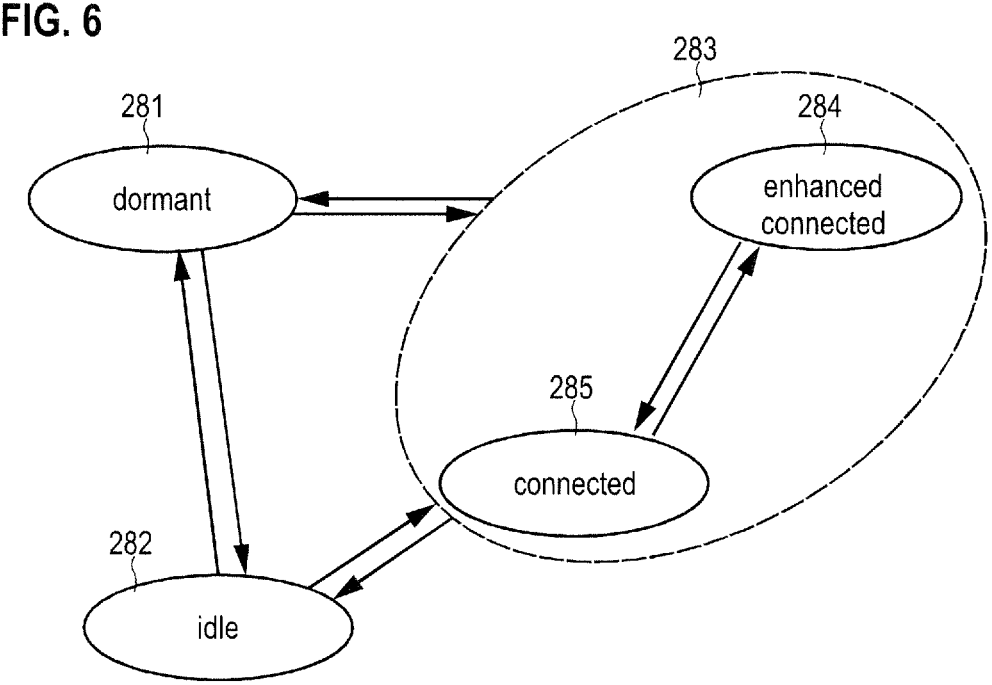
FIG. 6 schematically illustrates various RAN-based states for operation of a UE.

FIG. 6 schematically illustrates aspects with respect to various modes 281-285 in which the UE 130 can operate. Each modes 281-285 can imply different states of operation of the interface 1303 of the UE 130, e.g., as part of a respective DRX cycle.

FIG. 6 illustrates RAN modes of the UE 130, i.e., modes which define the behavior of the UE within the RAN 114. For example, respective mode indictors may be maintained in a BS of the RAN 114.

In the example of FIG. 6, a dormant mode 281 is illustrated. Here, the UE 130 is not fully detached from the network 100, thus? still registered, e.g., in EMM registered according to 3GPP LTE specification. Position updates are typically not transmitted from the UE 130 to the network 100. Thus, the network 100 is unaware of a position of the UE 130. For details on the dormant state, see 3GPP TS 23.401 V13.0.0 (2014-09), section 4.3.22 "UE Power Saving Mode". For example, see 3GPP TS 23.682 V13.4.0 (2015-12). The network-initiated paging procedure is described in 3GPP TS 23.401.

In the further modes 282-285, the UE 130 is generally ready to receive DL data, e.g., at least during certain time slots and/or on certain frequencies and/or according to certain coding/modulation. The further states 282-285 may implement DRX cycles using different states of the interface 1303.

In FIG. 6, an idle mode 282 is illustrated. The idle mode 282 may correspond to RRC idle in the 3GPP LTE framework. Here, the UE 130 can be paged during ON times of an idle mode DRX cycle. Position updates may only be transmitted comparably infrequently or with a coarse accuracy, e.g., not defined on cell level. In response to receiving a DL paging signal, the UE 130 may transition into a connected mode 283-285.

In a connected mode 285, the UE 130 maintains the data connection 160 with the network 100. See TS 36.331, chapter 4.2. This means that HOs between different serving cells of the cellular network 100 can be implemented without loss of the data connection 160. For this, the UE 130 may transmit measurement reports on a quality of communicating on the wireless link. The network 100 is aware of the serving cell. The connected mode 285 may implement a DRX cycle including an active state and a sleep state. During the active state the UE 130 may be ready to receive DL data. For example, the connected mode can be implemented by the 3GPP LTE RRC connected mode to a larger or smaller degree. In some examples, UE-initiated mobility can be prohibited in the connected mode 285.

According to various examples, it is possible that the UE performs UE-initiated mobility during the connected mode 283. However, in order to avoid inter-operability problems with the network, in such a case a transition into an enhanced connected mode 284 can be performed. The enhanced connected mode 284 could also be referred to as lightweight connected mode. In some examples, it is possible that during some set up procedure the UE 130 signals support of the enhanced connected mode 284 to the network 100. This may help to avoid interoperability problems.

The enhanced connected mode 284 may implement a DRX cycle including an active state and a sleep state. For example, in the enhanced connected mode 284 the UE may listen to DL paging signal in a respective active state of the interface 1303, rather than for DL data as in the connected mode 285. For example, during the enhanced connected mode 284, the UE may not send measurement reports for channel sensing. Such measures reduce the power consumption and the signaling overhead.

The connected mode 285 and the enhanced connected mode 284 could be formally treated as sub-modes of one and the same connected mode 283.

Figure 7:
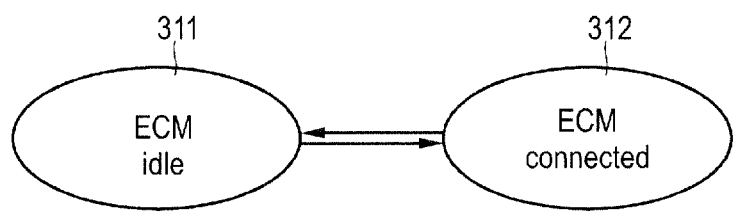
FIG. 7 schematically illustrates various CN-based states for operation of a UE.

FIG. 7 schematically illustrates aspects with respect to various modes 311-312 in which the UE 130 can operate. In particular, FIG. 7 illustrates CN modes of the UE 130, i.e., modes which define the behavior of the UE within the CN. For example, respective mode indictors may be maintained in the MME of the CN.

In an idle mode 311—e.g., implemented by 3GPP ECM idle —, the UE is on standby, but the MME is aware of a tracking area list. A data connection 160 is not established. The UE can be paged in the tracking area. UE-initiated mobility is possible. Conventionally, the ECM idle mode 311 is associated with the RRC idle mode 282. In the idle mode 311, the MME does not maintain a mobility control connection towards the UE 130.

In the connected mode 312—e.g., implemented by 3GPP ECM connected —, the MME maintains a mobility control connection towards the UE 130. The MME 116 may or may not be aware of the serving BS. In some examples, the MME 312 may maintain a mobility control connection with the UE 130; however, the actual position of the UE 130 may be hidden from the MME. In some examples, all data connections 160 are set, i.e., the ECM connected mode 312 is associated with the RRC connected mode. According to some examples, it is also possible that the ECM connected mode 312 is active, but the data connection 160 is released.

Figure 8:
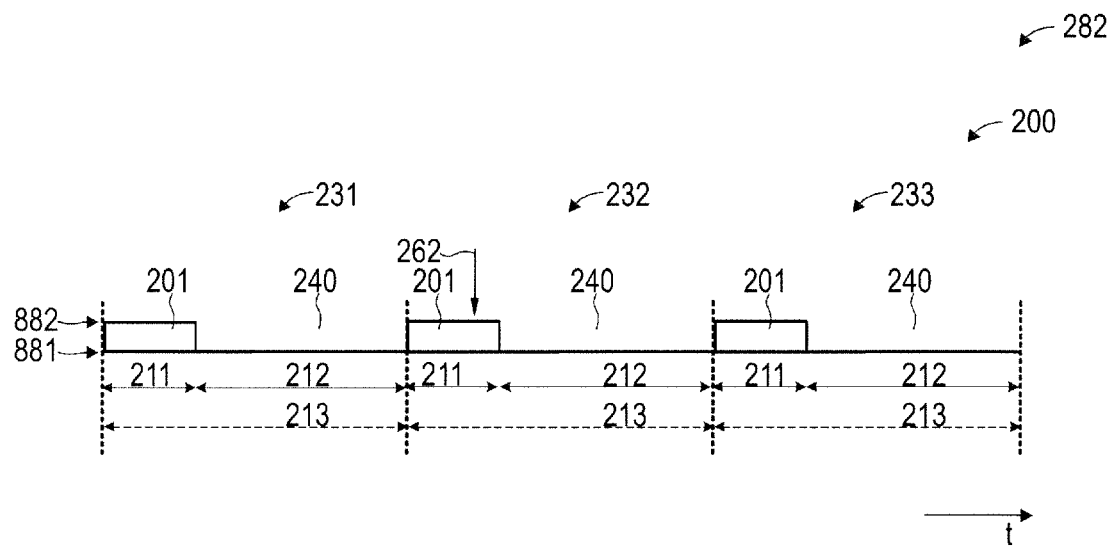
FIG. 8 schematically illustrates a DRX cycle according to various examples.

FIG. 8 schematically illustrates aspects with respect to a DRX cycle 200. Such techniques may be employed in the various examples described herein. In FIG. 8, for illustrative purposes, three repetitions 231-233 of the DRX cycle 200 are illustrated. However, the DRX cycle 200 may include a larger number of repetitions 231-233 or a smaller number of repetitions 231-233. The number of repetitions 231-233 may be defined a priori or may not be defined a priori.

Each repetition 231-233, according to the example of FIG. 8, includes an ON time 201 and an OFF time 240. For example, in the repetition 231, a duration 211 of the ON time 201 is shorter than a duration 212 of the OFF time 240. The durations 211, 212 add up to the duration 213 of the entire repetition 231. While in the example of FIG. 8 a periodicity of the repetitions 231-233 is implemented, in other examples, different repetitions may have different durations in other timings.

FIG. 8 illustrates and example DRX cycle 200 according to the idle mode 282. Here, during the ON time 201, the interface 1303 of the UE 130 is in an active state 882 and is ready to receive DL paging signal. Differently, during the OFF time 240, the interface 1303 is in a sleep state 881 and is not ready to receive signals and/or data to save power.

In the example of FIG. 8, reception of the DL paging signal 262 triggers a RACH procedure for setting up the data connection 160 (not shown in FIG. 8). Also, a NAS connection with the MME is established. As such, during the DRX cycle 200 of FIG. 8, the mobility control connection 161 with the MME 116 may be torn down.

Figure 9:
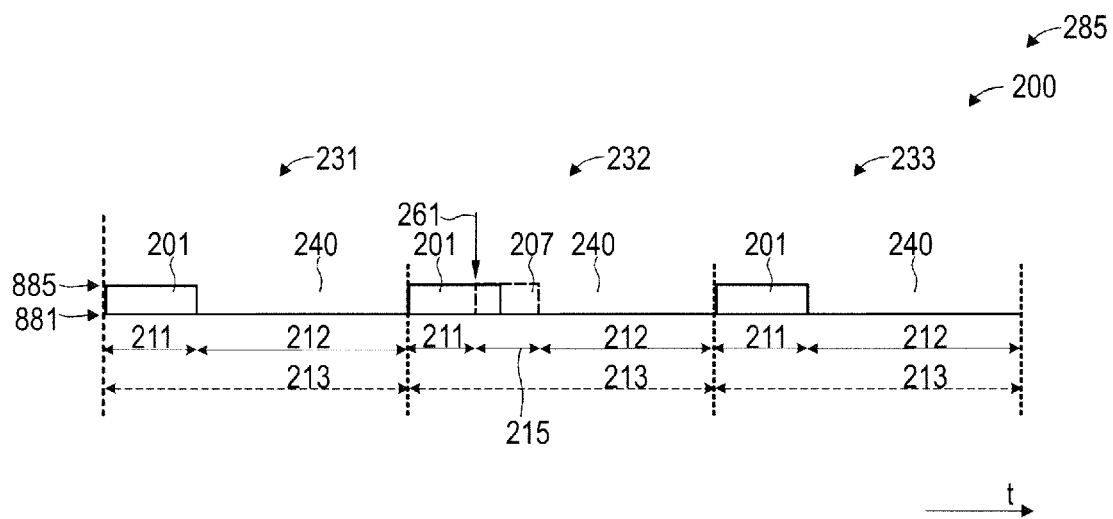
FIG. 9 schematically illustrates a DRX cycle according to various examples.

FIG. 9 schematically illustrates aspects with respect to a DRX cycle 200. Such techniques may be employed in the various examples described herein.

The example of FIG. 9 generally corresponds to the example of FIG. 8. However, in FIG. 9, the DRX cycle 200 is implemented for the connected mode 285. Here, the UE 130 listens for DL data 261—e.g., on PDCCH or PDSCH—during the ON time 201 by operating the interface in the active state 885. Reception of the DL data 261 triggers an inactivity timer 215 which implements a prolongation 207 of the ON time 201.

Figure 10:
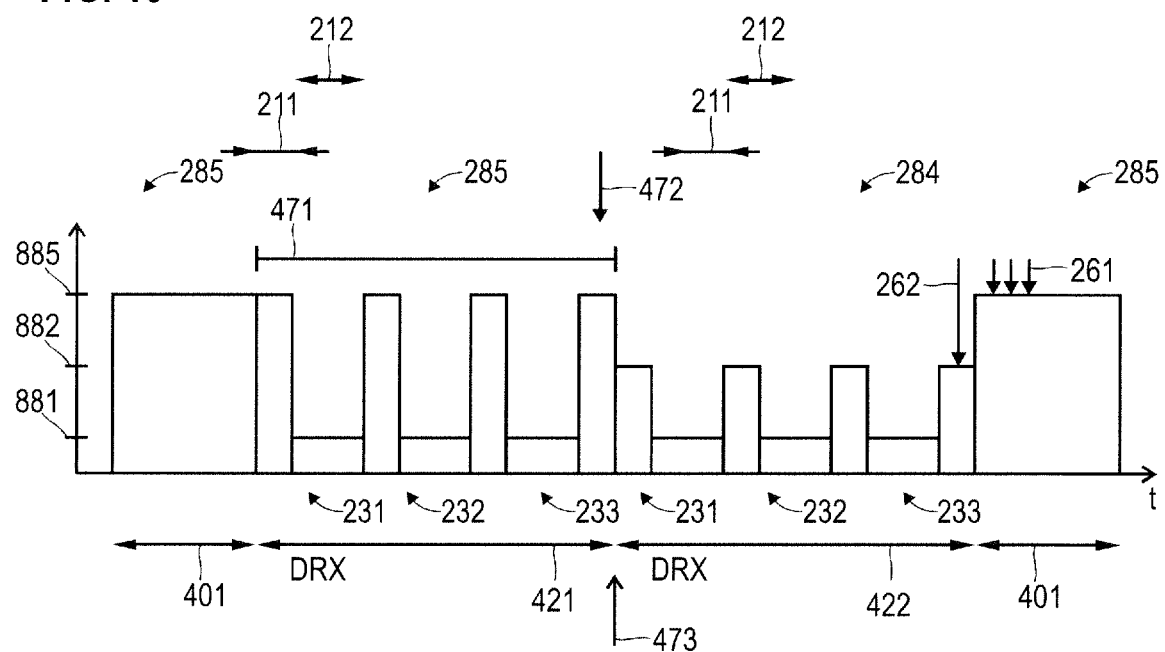
FIG. 10 schematically illustrates a DRX cycle according to various examples.

FIG. 10 schematically illustrates aspects with respect to operating according to different DRX cycles 421, 422. In particular, FIG. 10 illustrates aspects with respect to transitioning from operation according to the DRX cycle 421—corresponding to the connected mode 285—into operation according to the DRX cycle 422—corresponding to the enhanced connected mode 284—depending on certain trigger criteria 471, 472.

First, persistent operation 401 according to the connected mode 285 is activated (state 885). Here, a DRX cycle is not active. Rather, the interface 1303 of the UE 130 is ready to receive data without intermission, because it operates in the active state 885. In particular, the UE 130 listens for DL data.

After a while, the DRX cycle 421 is activated for the connected mode 285. During the ON times, the UE 130 is ready to receive DL data in the active state 885. During the OFF times, the UE 130 is not ready to receive data and operates in the sleep state 882. For example, during the DRX cycle 421, the data connection 160, as well as the mobility control connection 161 can be maintained. Then, it is not required to perform a random access procedure for each repetition 231-233.

In FIG. 10, a timer 471 is illustrated. The timer 471 is initialized at the beginning of the DRX cycle 421. Eventually, the timer 471 expires. Expiry of the timer 471 is a prerequisite condition for operating according to a further DRX cycle 422 in the enhanced connected mode 284.

In FIG. 10, reception of a DL control message 472 is illustrated. The control message 472 is received from the network 100, e.g., from the BS 112. Also reception of the control message 472—which is indicative of instructions to trigger the DRX cycle 422—is a prerequisite condition for operating according to the DRX cycle 422. E.g., the control message 472 may be an RRC control message.

Once the prerequisite conditions 471, 472 are met, operation of the UE 130 transitions from the DRX cycle 421 to the DRX cycle 422. The UE 130 switches from the connected mode 285 to the enhanced connected mode 284, but it is not required to inform the network 100, in particular the CN 113, accordingly.

The DRX cycle 422 includes ON times during which the UE 130 listens for DL paging signals, because it operates in the active state 882. In the active state 882 the interface 1303 is not operable to receive DL data. During the ON times of the DRX cycle 422 the UE 130 does not listen for DL data, but only listens for DL paging signals 262. This reduces the power consumption. The DRX cycle 422 also includes OFF times during which the UE 130 is in the sleep state 881.

Eventually, in the active state 882 of the repetition 233 of the DRX cycle 422, the DL paging signal 262 is received. Then, in response to receiving the DL paging signal 262, the UE 130 performs a random access procedure to the network and sets up a data connection 160. This enables to receive DL data 261 in persistent operation 401 according to the connected mode 285.

Figure 11:
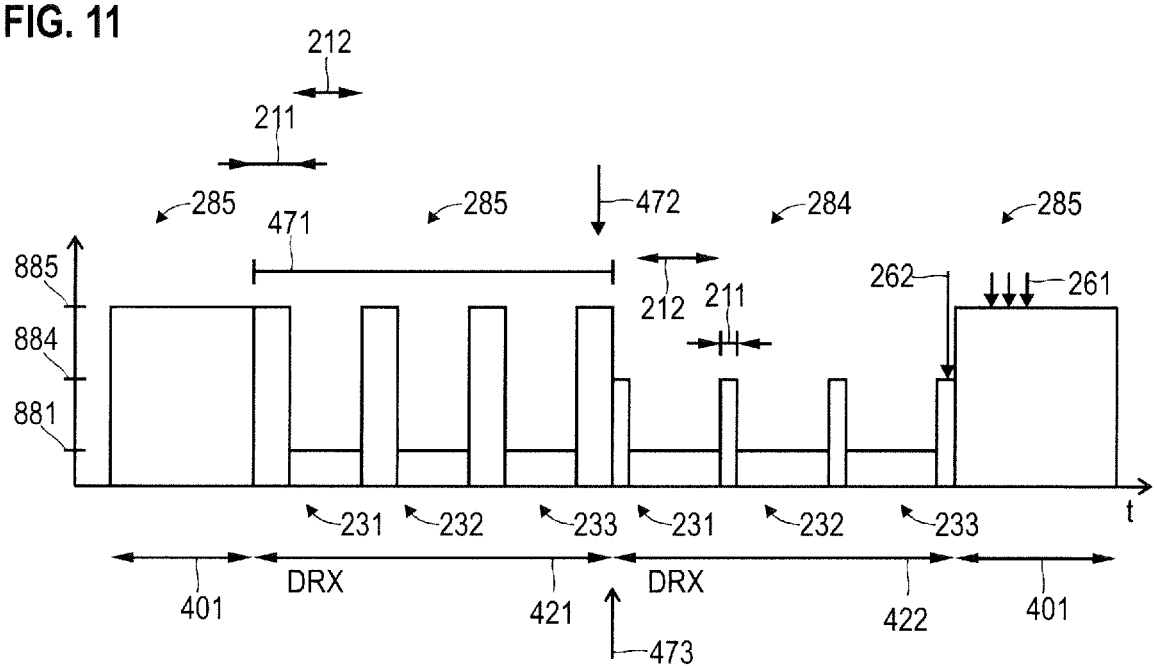
FIG. 11 schematically illustrates a DRX cycle according to various examples.

FIG. 11 schematically illustrates aspects with respect to operating according to different DRX cycles 421, 422. The example of FIG. 11 generally corresponds to the example of FIG. 10. In the example of FIG. 11, the DRX cycles 421, 422 implement different timings. In particular, the duty cycle is adjusted. This enables to further reduce the power consumption.

With respect to FIGS. 10 and 11, the two prerequisite conditions 471, 472 are cumulatively met before the DRX cycle 422 is activated and the UE 130 switches to the enhanced connected mode 284. The prerequisite conditions 471, 472 may be required before activating the enhanced connected mode 284; for example, UE-initiated mobility may be allowed only once the two prerequisite conditions 471, 472 are met. Generally, it should be understood that it is possible that the prerequisite condition is defined only with respect to the timer 471 or defined only with respect to the control message 472. It would also be possible to take into account, alternatively or additionally, further prerequisite conditions. Another prerequisite condition is UE-initiated mobility 473 (cf. FIGS. 10 and 11). For example, it would be possible that operation according to the DRX cycle 421 continues as long as no UE-initiated mobility 473 has occurred. Once the UE 130 decides to listen to transmission of a new target BS 112, operation according to the DRX cycle 422 can commence. This allows to implement low-latency DL data transmission prior to the UE-initiated mobility. Further, it facilitates avoidance of a need for performing a HO.

Sometimes, some or all of the prerequisite conditions 471, 472 to trigger the DRX cycle 422 may be met at a point in time; only later, the UE-initiated mobility may occur. Here, it may be desirable to operate according to an intermediate DRX cycle.

Figure 12:
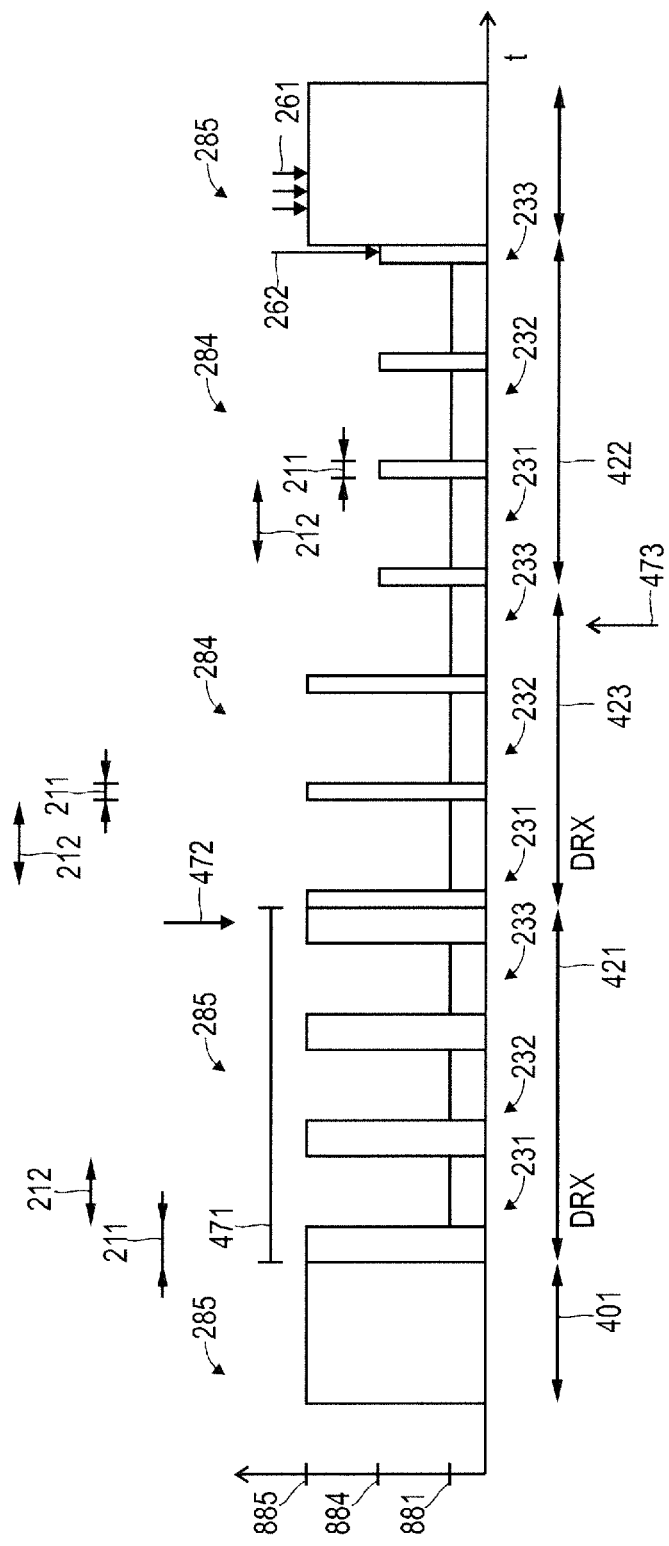
FIG. 12 schematically illustrates a DRX cycle according to various examples.

FIG. 12 schematically illustrates aspects with respect to operating according to different DRX cycles 421, 422 and according to an intermediate DRX cycle 423. The operation according to the intermediate DRX cycle 423 commences in response to meeting the prerequisite conditions 471, 472 and prior to operating according to the DRX cycle 422. The intermediate DRX cycle 423 may be associated with the enhanced connected mode 284. For example, the UE 130 may only be allowed to perform UE-initiated mobility one the intermediate DRX cycle 423 is active. In one example, the policies of the connected mode 285 may not allow UE-initiated mobility—but rather implement MME-controlled HOs; in such an example, the intermediate DRX cycle 423 may be associated with the enhanced connected mode 284, because UE-initiated mobility is now allowed.

The intermediate DRX cycle 423 includes the active state 285 and the sleep state 281. Hence, the UE 130 listens for DL data during the ON times of the intermediate DRX cycle 423. This enables low-latency DL transmission. In the example of FIG. 12, the DRX cycles 421, 423 are distinguished by different timings.

Figure 13:
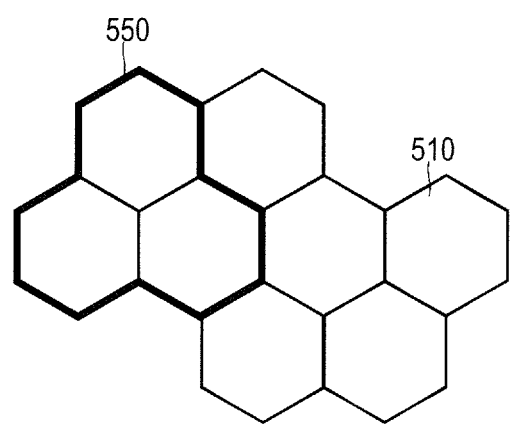
FIG. 13 schematically illustrates a RAN paging group according to various examples.

FIG. 13 illustrates aspects with respect to a network-defined paging group. In FIG. 13, a plurality of cells 510 are illustrated. For example, each cell 510 may be associated with one or more BSs.

A subset of all cells 510 belongs to a paging group 550. For example, if the UE 130 performs UE-initiated mobility between to BSs of the paging group 550, it may be possible to quickly page the UE 130. In some examples, the paging group 550 may relate to a tracking area (TA). The TA is defined with respect to MME-initiated paging. In other examples, the paging group 550 may not relate to a TA, but rather to a group defined for RAN-based paging, e.g., paging initiated by the BSs 112. The paging group 550 may be smaller than a typical TA. The paging group 550 may include nearest neighbor cells, in some examples.

According to some examples, the DRX cycle 422 may selectively/only be activated if the UE 130 detects that it moves within a paging group 550. The UE 130 may store a list of all BSs or cells belong to a paging group 550 for this purpose. This list may be updated from time to time using DL control signaling. If the UE 130, however, detects that it has moved out of the paging group 550, it may perform a regular HO procedure, for example, or may otherwise report to the network 100.

Figure 14:
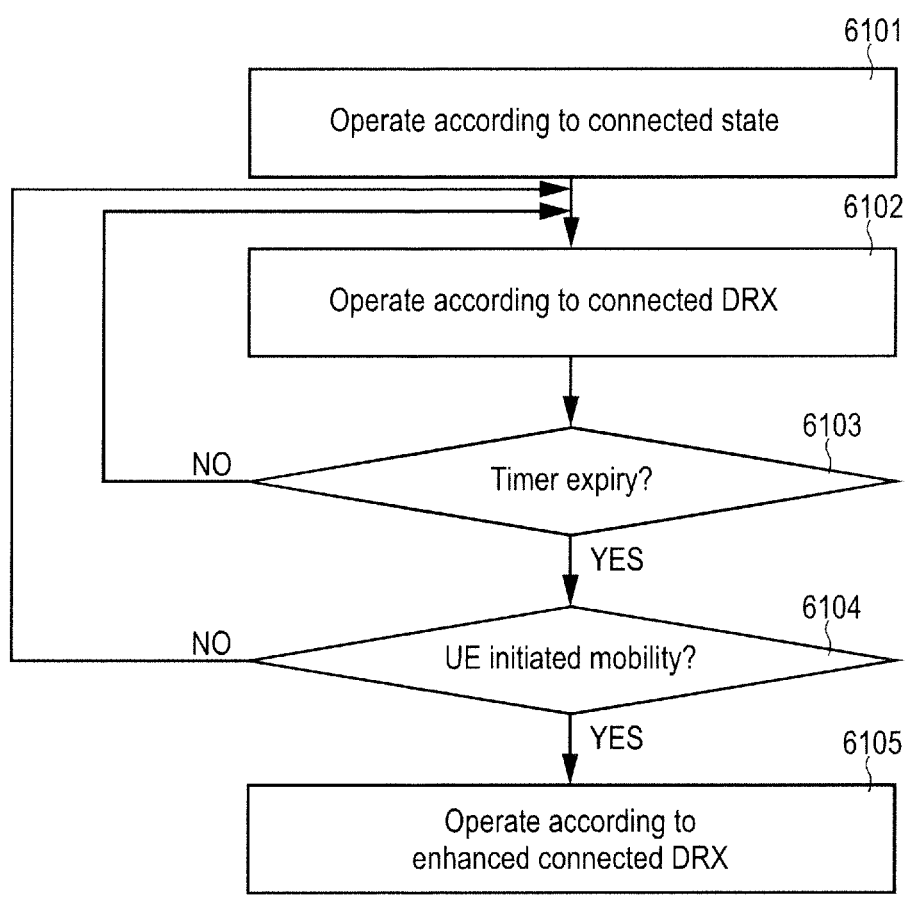
FIG. 14 is a flowchart of a method according to various examples.

FIG. 14 is a flowchart of a method according to various examples. FIG. 14 illustrates examples regarding transition from operation according to a first DRX cycle into operation according to a second DRX cycle in response to UE-initiated mobility.

Initially, the UE may attach to the network, e.g., using a RACH procedure (not shown in FIG. 14). Here, the UE may send a control message to the network which is indicative of support of the second DRX cycle. Alternatively or additionally, the control message may be indicative of support of the enhanced connected mode 284.

In block 6101, the interface of the UE does not operate according to DRX. Here, an active state of the interface is persistently activated. Block 6101 is optional.

Next, in block 6102, operation according to a DRX cycle commences. For example, a DRX cycle including an active state and an idle mode can be used. During the DRX cycle of block 6102, it is possible that the data connection 160 maintains set-up and ready to transmit data. The active state of the DRX cycle in block 6102 may include operating the interface of the UE such that it listens for DL data.

At block 6103, it is checked whether a prerequisite condition is met. The prerequisite condition may relate to expiry of a timer (cf. FIG. 14); but it would also be possible that another prerequisite condition is considered, e.g., reception of a DL control message from the network.

If the prerequisite condition at block 6103 is met, then the method commences with block 6104. In block 6104 it is checked whether UE-initiated mobility occurred. This may relate to the UE switching from listening to a source BS to listening to a target BS.

Next, in block 6105 operation according to a further DRX cycle commences which is at least partly different from the DRX cycle of block 6102. For example, the further DRX cycle may include a further active state which is different from the active state of the DRX cycle of block 6102. In particular, the further active state may relate to the UE listening to DL paging signals from the target BS; instead of listening for DL data.

When executing block 6105, in some examples a mobility control connection with a core node of the network, e.g., a NAS connection with a MME, can be maintained. For example, the mobility control connection may be set up during block 6101. Then, the respective parameters may be maintained, e.g., in a memory of the UE. This allows to pick up the mobility control connection upon need, e.g., in response to a RACH procedure. In particular, it is not required that the MME is informed of the UE-initiated mobility via the mobility control connection; the mobility control connection may be suspended.

Execution of block 6105 may commence until an abort criterion is met. Different abort criteria are conceivable, e.g.: reception of a DL paging signal; a number of RAN-triggered update messages exceeds a certain threshold; expiry of a timer; and/or degradation of radio quality below a threshold. When the abort criterion is met, the UE may, for example, transition into a persistent connected mode in which it listens for DL data or may transition into an idle mode.

Figure 15:
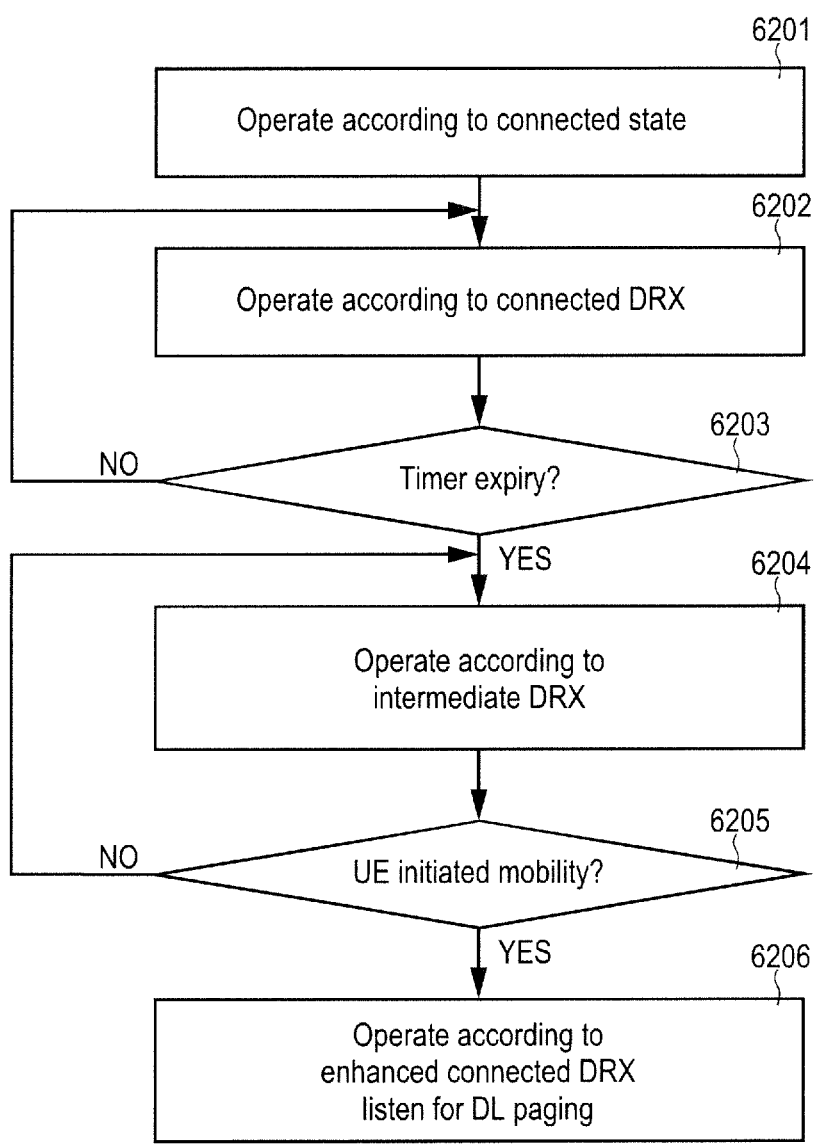
FIG. 15 is a flowchart of a method according to various examples.

FIG. 15 is a flowchart of a method according to various examples. FIG. 15 illustrates examples regarding transition from operation according to a first DRX cycle into operation according to a second DRX cycle in response to UE-initiated mobility. In particular, FIG. 15 illustrates an example where the transition from operation according to the first DRX cycle into operation according to the second DRX cycle is via an intermediate DRX cycle.

6201-6203 generally correspond to 6101-6103.

If the prerequisite condition is met at block 6203, an intermediate DRX cycle is activated, block 6204. The intermediate DRX cycle may generally correspond to the first DRX cycle of block 6202, but may have at least partly different parameters, e.g., a different timing. For example, the intermediate DRX cycle of block 6204 may include an active state and a sleep state. In the active state of block 6204, the interface of the UE may be operated to listen for DL data.

Blocks 6205 and 6206 correspond generally to blocks 6104 and 6105.

Figure 16:
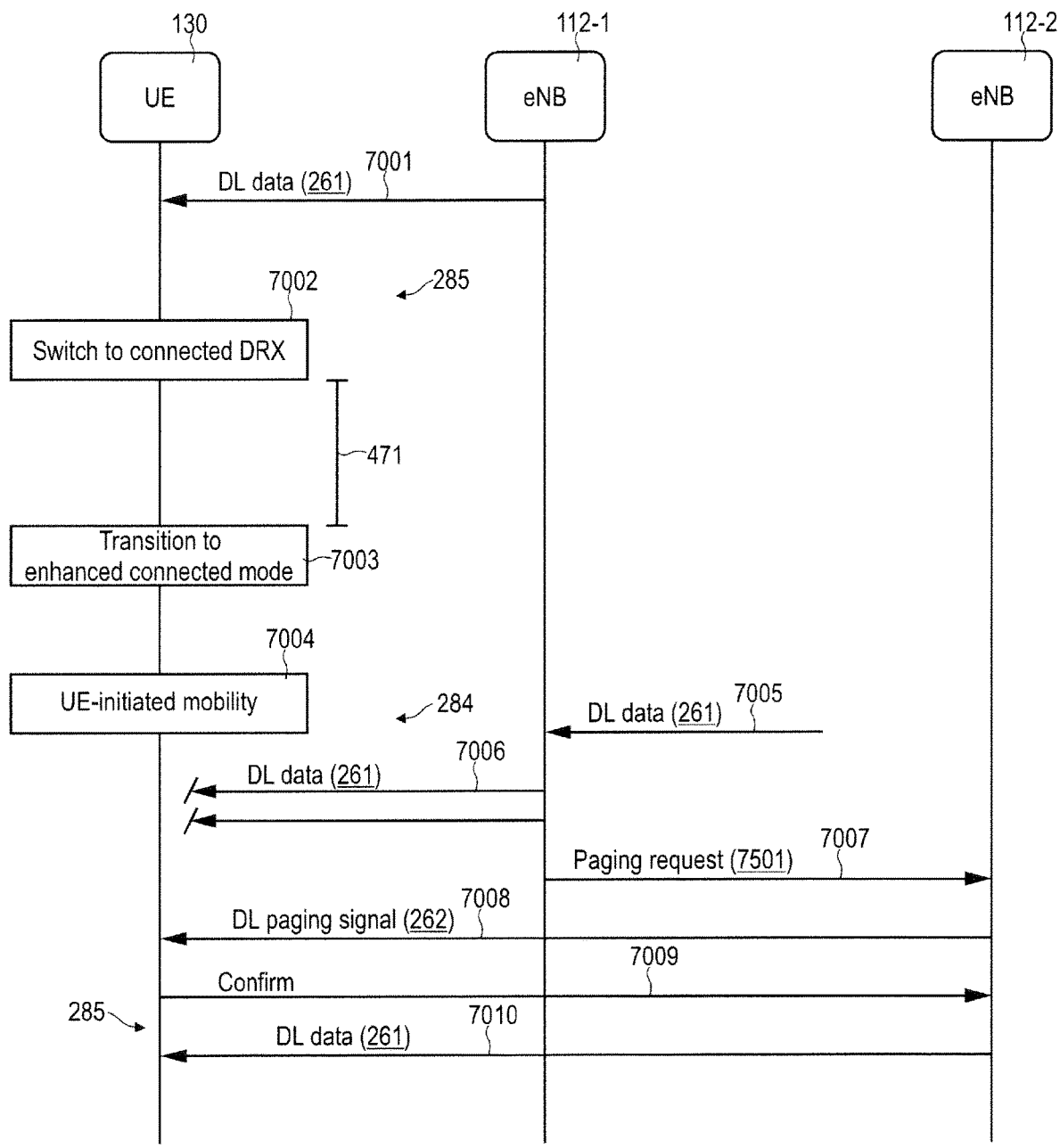
FIG. 16 is a signaling diagram illustrating RAN-based paging of a UE according to various examples.

FIG. 16 is a signaling diagram illustrating signaling flow between the UE 130 and BSs 112-1, 112-2. FIG. 16 illustrates aspects with respect to sending RAN-triggered DL paging signals 262.

At 7001, DL data 261 is transmitted from the eNB 112-1 to the UE 130. The DL data 261 is transmitted using a data connection 160. The UE 130 operates in connected mode 285. A DRX cycle may not be active.

After a while without a need for transmitting data, the UE 130 switches to operation according to a DRX cycle, 7002. The UE 130 continues to operate in connected mode 285. For example, the DRX cycle may include the active state 885 and a sleep state 881. Here, the interface 1303 may be operate to listen to DL data 261 from the network. The network 100, in particular the eNB 112-1, may be aware of the respective timing.

At 7003, the UE 130 transitions from connected mode 285 to enhanced connected mode 284. This is due to expiry of the timer 471; the timer 471 may be network-defined. Other prerequisite conditions would also be possible, e.g., a DL control message from the network 100. The transition at 7003 may or may not involve reconfiguration of certain parameters of the DRX cycle, e.g., its timing, etc. Generally, UE-initiated mobility may be prohibited before transitioning to the enhanced connected mode 284 at 7003. The network may not be informed about the transition at 7003.

For facilitating the transition from connected mode 285 to enhanced connected mode 284 at 7003, the UE 130 may be informed by the network 100 on at least one parameter. This may involve control signaling. The control signaling may occur during an attach procedure of the UE 130 to the network; or during a setup procedure for the data connection 160, e.g., an RRC Connection Setup procedure according to 3GPP LTE. Alternatively or additionally, the control signaling may occur at 7003. For example, it would be possible that a DL control message form the network 100 implements the prerequisite condition for transitioning into the enhanced connected mode 284, but also indicates the at least one parameter. Examples of the at least one parameter include: indication of the BSs which are part of a RAN-based paging group 550; an identification of the UE 130 if a RACH is performed in a neighbor cell; parameters of a new DRX cycle, e.g., new timing parameters etc.

At 7004, UE-initiated mobility occurs. This may be despite an active data connection 160 and despite an active mobility control connection 161 with a core node of the network 100. The UE 130 now listens for transmission from the target eNB 112-2, rather than from transmissions from the source eNB 112-1. The network 100 is not informed of the UE-initiated mobility, to reduce control signaling overhead.

Optionally, at 7004, the UE 130 may switch to operation according to another DRX cycle; this DRX cycle may include the active state 884 in which the UE listens for DL paging, rather than for DL data. This may be associated with switching to the enhanced connected mode 284. The network 100 may not be informed accordingly.

At 7005, DL data 261 arrives at the source eNB 112-1. This is because the network 100 is not aware of the UE-initiated mobility, yet. For example, the SGW may route the DL data to the source eNB 112-1, because this is the last known serving eNB of the UE 130.

Then, the eNB 112-1 attempts to transmit the DL data 261 at 7006. This may be done using the data connection 160 which may be still active in the eNB 112-1. The transmission attempts fail, because the UE 130 does not listen to the source eNB 112-1 anymore. For example, the eNB 112-1 does not receive any acknowledgement from the UE 130.

Then, the eNB 112-1 triggers paging of the UE 130 (RAN-based paging). This involves sending a control message 7501 to the eNB 112-2 at 7007, and potentially to further eNBs of the paging group 550 (not shown in FIG. 16).

In response to receiving the control message 7501, the eNB 112-2 transmits a DL paging signal 262 to the UE 130. The DL paging signal 262 may include an indicator which is indicative of the UE 130 and/or a subscriber of the UE 130. For example, the DL paging signal 262 may include an indicator which is indicative of the DL paging signal 262 being triggered by the RAN 114. The MME 116 is not involved in the DL paging in the example of FIG. 16.

The UE 130 receives the DL paging signal 262 and confirms this, 7009. Then, a RACH procedure may be executed to set up the data connection 160 via the target eNB 112-2 (not shown in FIG. 16). The RACH procedure may use at least one parameter previously provided by the source eNB 112-1. Eventually, the eNB 112-2 transmits the DL data 261 to the UE 130, 7010. The UE 130 is again in the connected mode 285.

During the time between 7001 and 7010 it is possible to maintain the mobility control connection with the CN node, e.g., the MME 116. Using the mobility control connection, the CN node can then be informed of the target eNB 112-2 after 7010. For example, the mobility control connection can be implemented in a NAS of the data connection 160.

Figure 17:
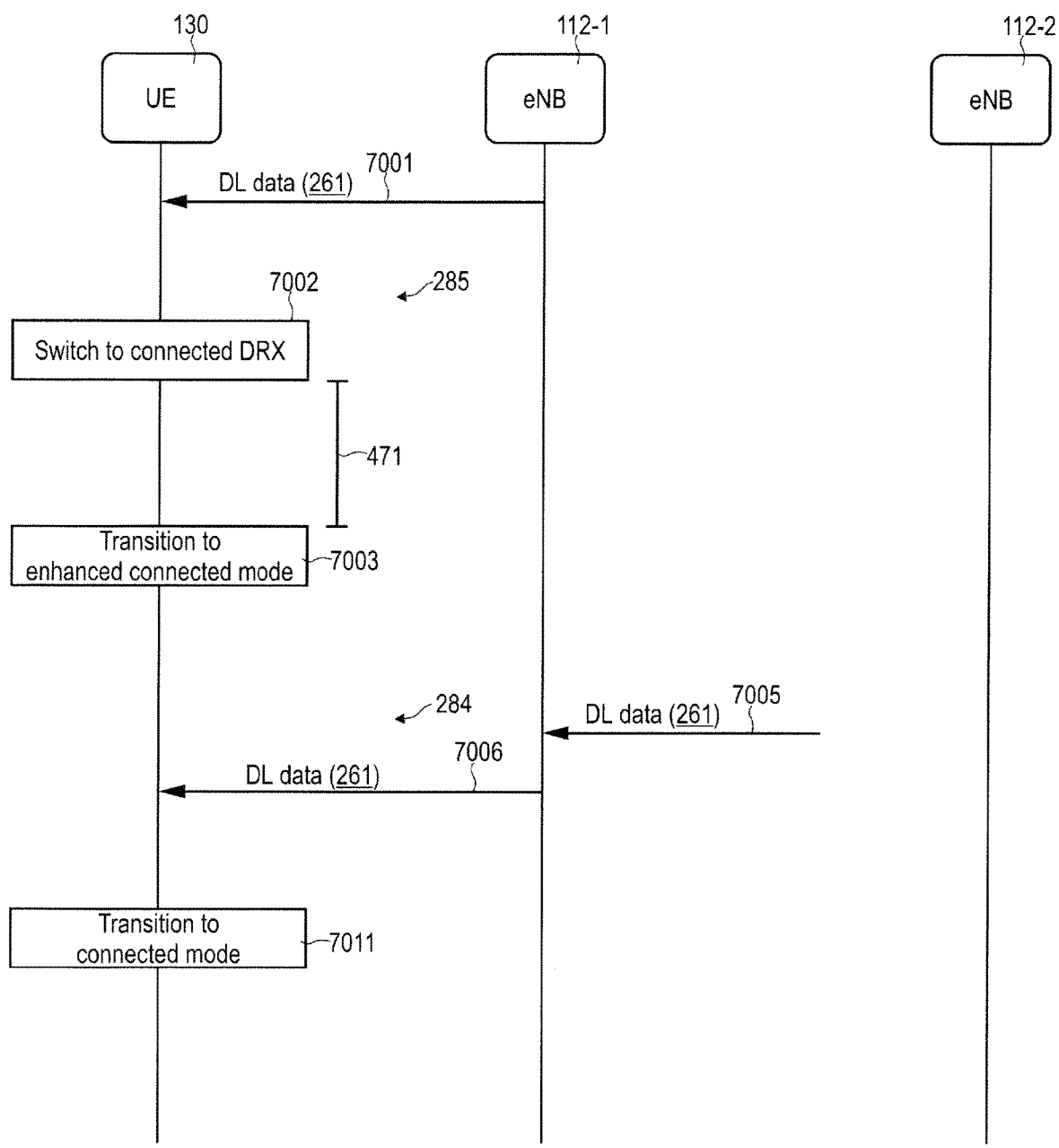
FIG. 17 is a signaling diagram illustrating transition into an enhanced connected mode according to various examples.

FIG. 17 is a signaling diagram illustrating signaling flow between the UE 130 and BSs 112-1, 112-2. FIG. 17 illustrates aspects with respect to sending RAN-triggered DL paging signals 262. FIG. 17 generally corresponds to FIG. 16. However, in FIG. 17, UE-initiated mobility does not occur—albeit in principle allowed after 7003—before transmission of the DL data 261 at 7006. Thus, the UE 130 is able to receive the DL data 261 and, in response thereto, transitions back to connected mode 285, 7011.

Summarizing, above techniques have been described which enable to reduce the power consumption of the UE and to reduce control signaling overhead. This is achieved by an enhanced connected mode using DRX. These techniques also offer the potential for low latency transmission of DL data, in particular as long as the UE has not moved from a source BSs to a target BSs.

A mismatch between the CN state of the UE—e.g., the 3GPP LTE ECM state—and the RAN state of the UE—e.g., the 3GPP LTE RRC state—can be avoided. For example, both the CN state, as well as the RAN state may indicate that the UE is connected. A state mismatch is avoided.

If compared to reference implementations of connected mode DRX, it is possible to perform UE-initiated mobility even though a DRX cycle is used where the active state includes listening for DL data. This reduces an overhead associated with HO control signaling.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

Illustrating this, while above various examples have been described with respect to a 3GPP LTE architecture, respective techniques may also be readily applied for other kinds and types of networks.

For example, while above various examples have been described with respect to different DRX cycles being implemented by a connected mode and an enhanced connected mode, similar considerations could be readily implemented using a single connected mode, i.e., without discriminating between the connected mode and the enhanced connected mode. This may be in particular true in view of the lack of uplink control singling of a UE-initiated transition from enhanced connected mode to connected mode.

For example, above various scenarios have been described in view of the first DRX cycle and the second DRX cycle. It is, however, not mandatory that the various connected modes are associated with DRX cycles. For example, it would be possible to operate in connected mode until a prerequisite condition for transitioning into the enhanced connected mode is fulfilled. During the connected mode, a data connection such as a bearer may be set up and maintained. The UE context may be defined. The data connection and/or the UE context may be continuously—i.e., without interruption—maintained during the enhanced connected mode. However, during the enhanced connected mode—different from the connected mode—UE-initiated mobility may be allowed. The network may or may not be informed on said transitioning into the enhanced connected mode. Various prerequisite conditions as explained herein are conceivable, e.g., timer expiry or reception of a control message. Such techniques may be combined with DRX operation or persistent operation.

The invention claimed is:

1. A terminal, comprising:
an interface configured to wirelessly communicate with a network having a plurality of base stations, and
at least one processor configured to control the interface to operate according to a first discontinuous reception cycle, to detect terminal-initiated mobility from a source base station of the plurality of base stations to a target base station of the plurality of base stations, and to control the interface to switch from operating according to the first discontinuous reception cycle to operating according to a second discontinuous reception cycle in response to the detected terminal-initiated mobility.

2. The terminal of claim 1,
wherein the at least one processor is configured to selectively control the interface to operate according to the second discontinuous reception cycle if a prerequisite condition is met, wherein the prerequisite condition includes at least one of expiry of a timer and reception of a network-originating control message indicative of instructions to trigger the second discontinuous reception cycle.

3. The terminal of claim 2,
wherein the at least one processor is configured to control the interface to operate according to an intermediate discontinuous reception cycle in response to meeting the prerequisite condition and prior to operating according to the second discontinuous reception cycle.

4. The terminal of claim 3,
wherein the intermediate discontinuous reception cycle includes an active state and a sleep state,
wherein the interface is configured to listen for downlink data during the active state.

5. The terminal of claim 3,
wherein the at least one processor is configured to control the interface to implement different timings for the first discontinuous reception cycle and for the intermediate discontinuous reception cycle, the timings defining at least one of the following: a duration of at least one of the states of the respective discontinuous reception cycle; a duty cycle of the respective discontinuous reception cycle; and an inactivity timer of the respective discontinuous reception cycle.

6. The terminal of claim 1,
wherein the at least one processor is configured to selectively control the interface to operate according to the second discontinuous reception cycle if the target base station is part of a network-defined radio access network paging group of base stations.

7. The terminal of claim 1,
wherein the first discontinuous reception cycle includes an active state and a sleep state, wherein the interface is configured to listen for downlink data during the active state.

8. The terminal of claim 7,
wherein the second discontinuous reception cycle includes a further active state and a sleep state, wherein the further active state of the second discontinuous reception cycle is different from the active state of the first discontinuous reception cycle.

9. The terminal of claim 8,
wherein the interface is configured to listen for downlink paging signals during the further active state of the second discontinuous reception cycle.

10. The terminal of claim 9,
wherein the downlink paging signals are triggered by a radio access network of the network.

11. The terminal of claim 9, wherein the processor is configured to maintain a previously established mobility control connection with a core node of the network during the second discontinuous reception cycle, and
- wherein the at least one processor is configured to perform a random access procedure to the network in response to receiving one of the downlink paging signal to set up a data connection with the target base station,
- wherein the at least one processor is configured to implement control signaling of the maintained mobility control connection via the data connection.

12. The terminal of claim 1,
- wherein the processor is configured to maintain a previously established mobility control connection with a core node of the network during the second discontinuous reception cycle.

13. The terminal of claim 1,
- wherein the first discontinuous reception cycle and the second discontinuous reception cycle are associated with a connected mode of the terminal.

14. The terminal of claim 1,
- wherein the at least one processor is configured to control the interface to implement different timings for the first discontinuous reception cycle and the second discontinuous reception cycle, the timings defining at least one of the following: a duration of at least one of the states of the respective discontinuous reception cycle; a duty cycle of the respective discontinuous reception cycle; and an inactivity timer of the respective discontinuous reception cycle.

15. The terminal of claim 1,
- wherein the at least one processor is configured to perform the terminal-initiated mobility without control signaling to the network.

16. A system, comprising:
- the terminal of claim 1, and
- a base station comprising at least one processor configured to attempt transmission of downlink data to a terminal according to a first discontinuous reception cycle of the terminal, and, if the transmission of the downlink data fails, to trigger transmission of a downlink paging signal to the terminal according to a second discontinuous reception cycle of the terminal.

17. A base station, comprising:
- at least one processor configured to:
- attempt transmission of downlink data to a terminal according to a first discontinuous reception cycle of the terminal, and, if the transmission of the downlink data fails, to trigger transmission of a downlink paging signal to the terminal according to a second discontinuous reception cycle of the terminal; and
- transmit a control message to at least one further base station of a network-defined radio access network paging group of base stations to trigger the transmission of the downlink paging signal by the at least one further base station.

18. A method, comprising:
- controlling an interface of a terminal to operate according to a first discontinuous reception cycle for communication with a network having a plurality of base stations,
- detecting terminal-initiated mobility from a source base station of the plurality of base stations to a target base station of the plurality of base stations, and
- controlling the interface to switch from operating according to the first discontinuous reception cycle to operating according to a second discontinuous reception cycle in response to the detected terminal-initiated mobility.

19. A method, comprising:
- attempting transmission of downlink data to a terminal according to a first discontinuous reception cycle of the terminal,
- based on a deemed failure of the attempted transmission: triggering transmission of a downlink paging signal to the terminal according to a second discontinuous reception cycle of the terminal, and
- transmitting a control message to at least one further base station of a network-defined radio access network paging group of base stations to trigger the transmission of the downlink paging signal by the at least one further base station.

* * * * *